United States Patent [19]

Rogers

[11] 4,350,411
[45] Sep. 21, 1982

[54] TRANSFER LENS AND HEAD-DOWN DISPLAY USING THE SAME

[75] Inventor: Philip J. Rogers, Clwyd, Wales

[73] Assignee: Pilkington P.E. Limited, Great Britain

[21] Appl. No.: 143,532

[22] Filed: Apr. 25, 1980

[30] Foreign Application Priority Data

May 16, 1979 [GB] United Kingdom ............... 7916927

[51] Int. Cl.³ ................... G02B 13/24; G02B 27/10; G02B 9/62; F02B 9/64
[52] U.S. Cl. ..................... 350/174; 350/45; 350/412; 350/463; 350/464
[58] Field of Search ............ 350/464, 463, 465, 469, 350/412, 174, 45

[56] References Cited

U.S. PATENT DOCUMENTS

| | | | |
|---|---|---|---|
| 2,721,499 | 10/1955 | Bertele | 350/465 |
| 3,297,822 | 1/1967 | Braid | 350/174 |
| 3,366,436 | 1/1968 | Rickless | 350/463 |
| 3,537,771 | 11/1970 | Trufanoff | 350/45 |
| 3,732,428 | 5/1973 | Spangler | 350/174 |
| 4,206,975 | 6/1980 | Maeda | 350/464 |

FOREIGN PATENT DOCUMENTS 924914  5/1963  United Kingdom ............... 350/464

*Primary Examiner*—Ronald J. Stern
*Attorney, Agent, or Firm*—F. Eugene Davis, IV

[57] ABSTRACT

A transfer lens comprises a first field-flattening component of negative power, a second component of positive power providing overcorrect astigmatism, a third component of positive power consisting of a plurality of positive members providing most of the power of the overall lens and whose undercorrect astigmatism is corrected by the overcorrect astigmatism of the second component, and a fourth component of negative power which increases the field angle. The lens is particularly useful in a head-down display having two primary displays from which light travels to a combiner so that the transfer lens produces a combined image. A Fresnel field lens is preferably located at the image position.

20 Claims, 5 Drawing Figures

TRANSFER LENS AND HEAD-DOWN DISPLAY USING THE SAME

BACKGROUND OF THE INVENTION

This invention concerns improvements in or relating to lenses and relates more particularly to transfer lenses.

A transfer lens functions to transfer visual information from a position or positions at which the visual information is presented on a primary display means to another position at which it is viewable by an observer or at which further optics, such as a field lens, act. Usually the transfer lens effects a relatively low magnification. The primary display means may comprise two primary displays from which light is combined so that the transfer lens produces a combined image of the two displays.

A particular example of use of a transfer lens is in an aircraft head-down display which enables the pilot to view simultaneously visual information primarily displayed on a cathode ray tube and on a map screen. In this example the exit pupil of the transfer lens is re-imaged by a field lens at a position in the vicinity of the pilot's head. In order to permit the pilot considerable freedom of head movement whilst still being able to see the combined image of the cathode ray tube display and the map display a large diameter final exit pupil is required. A high aperture transfer lens is therefore needed. Further, there is generally a requirement that the physical space occupied by the optics, and in particular the distance between the cathode ray tube/map screen and the field lens, should be kept to a minimum. The transfer lens therefore needs a wide angular field of view.

SUMMARY

According to the present invention there is provided a transfer lens comprising a first component which in use is towards the object, the first component being a field-flattening component of negative power which reduces the Petzval sum of the overall lens, a second component of positive power which provides overcorrect astigmatism, a third component of positive power consisting of a plurality of positive members and which provides most of the power of the overall lens, undercorrect astigmatism of the third component being corrected by the overcorrect astigmatism of the second component, and a fourth component of negative power which increases the field angle of the overall lens.

The first component may consist of a negative singlet element having a concave surface facing towards the second component. The negative singlet element may be meniscus or plano-concave or double concave.

The second component may consist of a positive singlet double convex element whose convex surface facing the third component is of stronger curvature, i.e. has a smaller radius of curvature, than its convex surface facing towards the first component, the overcorrect astigmatism being provided at the stronger curvature surface.

The third component may comprise one or more positive doublet members. Thus the third component may consist of two positive doublet members, or a positive doublet member and a positive singlet member or element, or two positive doublet members and a positive singlet member or element.

The fourth component may comprise two negative singlet meniscus elements whose concave surfaces face towards the third component and whose shapes reduce distortion and pupil spherical aberration effects inherent in the fourth component. The fourth component may include an additional positive member to give better control at higher apertures, which may be a positive singlet meniscus element whose convex surface faces towards the third component.

A transfer lens in accordance with the invention may have an aperture of about F/1 or higher and an angular field of view greater than 70 degrees. It may effect a magnification of around ×2.7.

The invention further provides display apparatus including a transfer lens as set forth above and further comprising a primary display means providing an object for the transfer lens and a field lens, which may be a Fresnel lens, located at the position of the image given by the transfer lens. The primary display means may comprise two primary displays, the apparatus including combiner means, such as a partial reflector, effective to combine light from the two primary displays so that the transfer lens produces a combined image. From this aspect the invention more specifically provides a head-down display apparatus, for example for an aircraft, comprising a cathode ray tube and a map screen, combiner means effective to combine light from the cathode ray tube and the map screen, a transfer lens as set forth above for imaging the combined light at an image position, and a field lens at that image position. The first and second components of the transfer lens may be located between the primary display and the combiner means and may therefore be duplicated in the light paths from the two display means and specifically the cathode ray tube and the map screen.

BRIEF DESCRIPTION OF THE DRAWINGS

Apparatus and transfer lenses in accordance with the invention will now be described, by way of example, with reference to the accompanying drawings in which.

DESCRIPTION OF THE PREFERRED EMBODIMENTS

Figure 1:
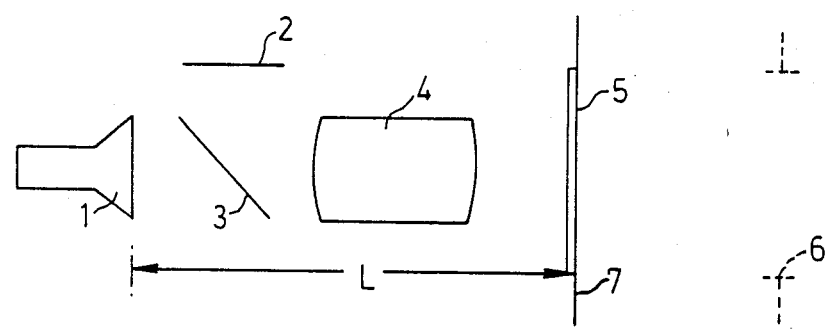
FIG. 1 is a schematic representation of an aircraft head-down display incorporating a transfer lens.

The head-down display of FIG. 1 comprises a cathode ray tube 1 on which visual information is displayed, and a map screen 2 on which further visual information in the form of a primary map image is displayed. This primary map image is back projected on to the screen 2 by a map projection lens (not shown). Light from the cathode ray tube 1 and from the map screen 2 travels to a combiner in the form of a partial or semi-reflector 3. Specifically as shown light from the cathode ray tube 1 transmitted through the partial reflector 3 is combined with light from the map screen 2 reflected from the partial reflector 3.

A transfer lens 4 produces a magnified combined image of the visual information displayed on the cathode ray tube 1 and on the map screen 2 at an image position. A Fresnel field lens 5 is located at that image and re-images the exit pupil of the transfer lens 4 at a final exit pupil 6. This final exit pupil 6 is in the vicinity of the pilot's head position and may, for example, be at a distance of about 800 mm from the field lens 5. The field lens 5 is conveniently located at the aircraft's instrument panel facia 7. The pilot viewing effectively through the final exit pupil 6 can thus see simultaneously an image of the visual information displayed on the cathode ray tube 1 and an image of the visual information displayed on the map screen 2, the images being superposed in a combined image. The magnification effected by the transfer lens 4, i.e. the ratio of the image size relative to the size of the primary displays 1 and 2, may be for example about ×2.7.

In order to permit the pilot considerable freedom of head movement whilst still being able to see the combined image of the cathode ray tube 1 and the map screen 2 a large diameter final exit pupil 6 is required, for example an exit pupil diameter of up to about 250 mm. To achieve this the transfer lens 4 has to be of high aperture of around F/1 or better. However, as regards contrast, in the normal practical situation the pilot's helmet effectively fills the exit pupil so as to prevent ambient light entering the system and reducing contrast to an unacceptable degree.

It is further generally required to minimise the physical space occupied by the optics and in particular the distance 'L' between the cathode ray tube 1 and the Fresnel field lens 5 should be kept as short as possible. To achieve this a wide angular field of view, for example of the order of 70 to 80 degrees, is required of the transfer lens 4.

Figure 2:
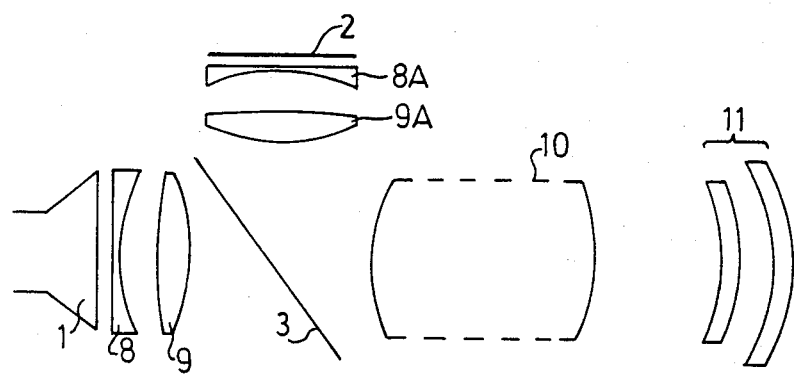
FIG. 2 is a schematic representation of a transfer lens for use in the head-down display of FIG. 1.

The transfer lens shown in FIG. 2 has a first component 8 located towards the cathode ray tube 1. This first component 8 is a field flattening component of negative power which lowers the Petzval sum of the overall lens whilst having little effect on the power because it is placed near to the object, i.e. the primary display provided by the cathode ray tube 1. Next to the first component 8 is a second component 9 which is of positive power and which provides overcorrect astigmatism for a reason explained later.

It will be seen from FIG. 2 that these first and second components 8 and 9 are located between the cathode ray tube 1 and the partial reflector 3. These components are therefore repeated or duplicated in the map display channel, i.e. similar first and second components 8A and 9A are correspondingly located between the map screen 2 and the partial reflector 3.

The transfer lens then has a third component 10 which is of positive power and provides most of the power of the overall lens. This power component 10 consists of a number of members all of positive power. It is split into a plurality of members in order to reduce aberrations, it being appreciated that the greater the number of members then the higher the aperture. The power component 10 suffers from undercorrect astigmatism which is corrected by the overcorrect astigmatism provided by the second component 9 (and 9A) as mentioned above.

After the third component 10 is a fourth component 11 which is of negative power and increases the field angle of the overall lens. This fourth component comprises a pair of negative meniscus singlet elements in order to reduce distortion and pupil spherical aberration effects. They may, but need not necessarily, have similar curvatures. In order to give better control at higher apertures, the fourth component 11 may additionally include an element of positive power (not shown in FIG. 2).

The first component 8 may have a focal length of about −2F (where F is the focal length of the overall lens) and more specifically in the range −1.6F to −2.2F. The second component 9 may have a focal length of about +2F and more specifically in the range +1.7F to +2.3F. The third component 10 may have a focal length of about +1.5F and more specifically in the range +1.4F to +1.8F. The fourth component 11 may have a focal length of around −2F to −4F and more specifically in the range −1.9F to −4.1F.

Figure 3:
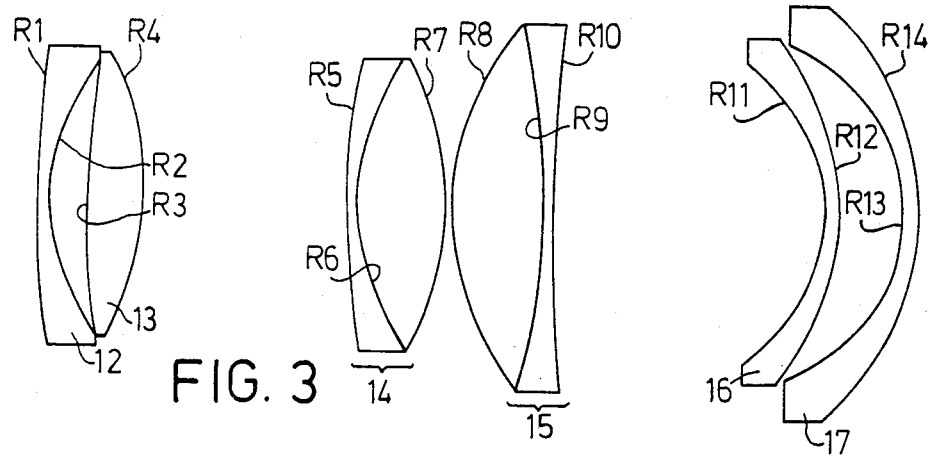
FIG. 3 is a schematic representation of a first embodiment of transfer lens.

In the embodiment of transfer lens shown in FIG. 3 the first component consists of a singlet negative field-flattening element 12 having a concave surface R2 facing away from the object (i.e. the primary display cathode ray tube 1 or map screen 2) and towards the exit pupil, i.e. towards the second component. In this embodiment the other surface R1 is convex so that the element 12 is meniscus convex towards the object.

The second component consists of a double-convex positive singlet element 13 whose surface R3 facing towards the object, i.e. towards the first component, is weaker, that is has a larger radius of curvature, than the surface R4 facing towards the exit pupil, i.e. towards the third component. The previously mentioned overcorrect astigmatism is provided at the stronger surface R4.

The third component consists of two positive doublet members 14 and 15. The doublet member 14 is bi-convex having convex outer surfaces R5 and R7, and has a cemented surface R6 which is convex towards the object. The doublet member 15 is meniscus having a convex outer surface R8 facing towards the object and a concave outer surface R10 facing towards the exit pupil, there being a cemented surface R9 which is concave towards the object.

The fourth component consists of two negative meniscus singlet elements 16 and 17 having respective concave surfaces R11 and R13 facing towards the object, i.e. towards the third component, and respective convex surfaces R12 and R14 facing towards the exit pupil.

A particular example of transfer lens in accordance with the FIG. 3 embodiment has numerical data as follows:

EXAMPLE 1

| Surface | Radius of Curvature | Axial Thickness/ Separation | Nd | V |
|---|---|---|---|---|
|  |  | 18.290 |  |  |
| R1 | +707.310 | 5.319 | 1.80518 | 25.43 |
| R2 | +124.264 | 24.095 |  |  |
| R3 | +630.258 | 32.653 | 1.69100 | 54.71 |
| R4 | −163.861 | 155.839 |  |  |
| R5 | +451.613 | 6.636 | 1.80518 | 25.43 |
| R6 | +158.646 | 51.876 | 1.51680 | 64.17 |
| R7 | −167.162 | 2.370 |  |  |
| R8 | +167.162 | 52.245 | 1.62041 | 60.33 |
| R9 | −517.390 | 7.953 | 1.62004 | 36.37 |
| R10 | +1129.909 | 189.598 |  |  |
| R11 | −103.884 | 7.637 | 1.51680 | 64.17 |
| R12 | −158.646 | 38.130 |  |  |
| R13 | −103.884 | 8.874 | 1.51680 | 64.17 |
| R14 | −158.646 | 149.982 |  |  |

EFL = 100; Aperture F/1.02; 73 degrees FOV Aperture Stop on R5; Magnification × 2.75 Nominal
CRT Faceplate:- Thickness 9.525; Nd 1.62041; V 60.33; Distance from R1 12.421
Fresnel field lens:- polymethylmethacrylate Thickness 5.351

In the above example, and in the examples which follow, the dimensional units are millimeters but the values are relative and can be scaled accordingly. Nd is the refractive index and V the constringence or Abbe number. The first value in the "Axial Thickness/Separation" column is the axial distance in free air between the object and the surface R1 and is applicable to the map display channel in FIG. 2 (i.e. it is the optical axial distance between the map screen 2 and the surface R1). In the cathode ray tube channel account has to be taken of the thickness of the cathode ray tube faceplate. The relevant figures for the cathode ray tube channel, i.e. the axial distance of surface R1 from the face plate of the cathode ray tube 1 and the thickness, refractive index and V value of the face plate, are given at the end of the example. The final value in the "Axial Thickness/Separation" column is the distance between the surface R14 and the Fresnel lens 5 in FIG. 1.

Figure 4:
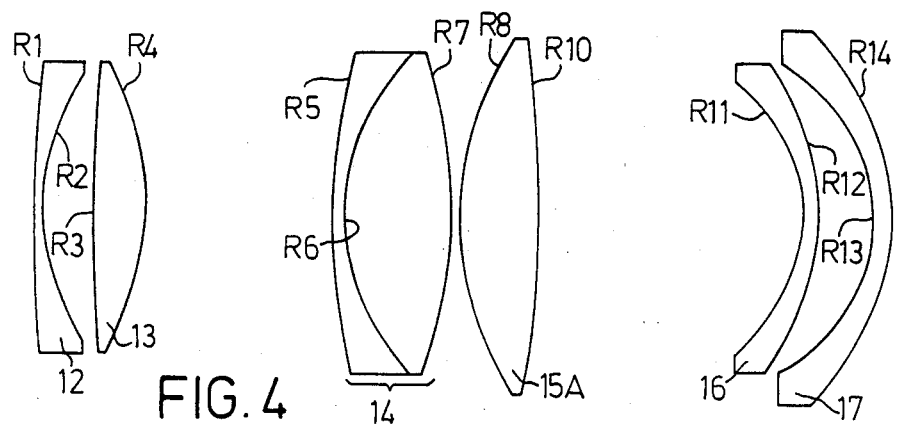
FIG. 4 is a schematic representation of a second embodiment of transfer lens.

The embodiment of transfer lens shown in FIG. 4 is basically similar to that of FIG. 3 except that the second doublet member 15 in the third component of FIG. 3 is replaced in FIG. 4 by a double convex positive singlet element 15A. FIG. 4 therefore omits the cemented surface R9. A particular example of transfer lens in accordance with the FIG. 4 embodiment has numerical data as follows:

EXAMPLE 2

| Surface | Radius of Curvature | Axial Thickness/ Separation | Nd | V |
|---|---|---|---|---|
|  |  | 13.747 |  |  |
| R1 | +1181.789 | 4.673 | 1.78472 | 25.76 |
| R2 | +140.179 | 29.170 |  |  |
| R3 | +863.839 | 30.167 | 1.71300 | 53.93 |
| R4 | −174.308 | 156.665 |  |  |
| R5 | +454.175 | 6.275 | 1.78472 | 25.76 |
| R6 | +129.746 | 62.697 | 1.58913 | 61.27 |
| R7 | −254.457 | 0.919 |  |  |
| R8 | +178.588 | 46.682 | 1.58913 | 61.27 |
| R10 | −751.714 | 186.082 |  |  |
| R11 | −99.114 | 8.480 | 1.58913 | 61.27 |
| R12 | −150.049 | 33.213 |  |  |
| R13 | −99.114 | 9.452 | 1.58913 | 61.27 |
| R14 | −150.049 | 161.059 |  |  |

EFL = 100; Aperture F/0.99; 72 degrees FOV; Aperture Stop on R5; Magnification × 2.75 Nominal
CRT Faceplate: - Thickness 9.846; Nd 1.62041; V 60.33; Distance from R1 7.680
Fresnel field lens: - polymethylmethacrylate Thickness 5.335

The embodiment of transfer lens shown in FIG. 5 differs from those shown in FIGS. 3 and 4 in the following respects.

Figure 5:
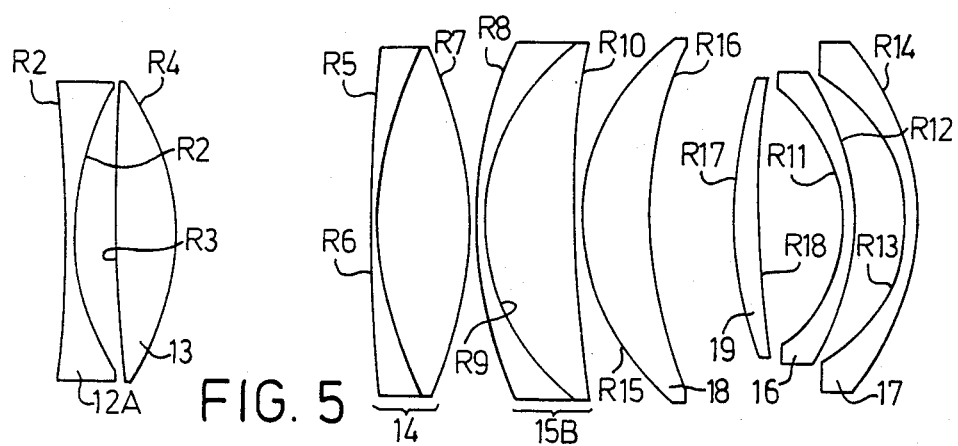
FIG. 5 is a schematic representation of a third embodiment of transfer lens.

In FIG. 5 the first component is a double concave negative singlet element 12A instead of the meniscus element 12 of FIGS. 3 and 4. Thus the surface R2 in all three embodiments is concave towards the exit pupil, i.e. towards the second component, but in FIG. 5 the surface R1 is concave towards the object whereas in FIGS. 3 and 4 it is convex towards the object.

In FIG. 5 the third component consists of two positive doublet members 14 and 15B and a positive meniscus singlet element 18 convex towards the object. In FIG. 5 the doublet member 14 is similar to that in FIGS. 3 and 4. The doublet member 15B is meniscus with its convex outer face R8 facing towards the object and its concave outer face R10 facing towards the exit pupil but, unlike the doublet member 15 in FIG. 3, the cemented surface R9 of the member 15B is convex towards the object. The additional positive meniscus element 18 in the third component of FIG. 5 has its convex surface R15 facing towards the object and its concave surface R16 facing towards the exit pupil, the element 18 being located on the exit pupil side of the third component.

In FIG. 5 the fourth component includes, in addition to the negative meniscus elements 16 and 17 as in FIGS. 3 and 4, a positive meniscus singlet element 19 having its convex surface R17 facing towards the object, i.e. towards the third component, and its concave surface R18 facing towards the exit pupil. The additional positive meniscus element 19 is located on the object side of the fourth component.

The FIG. 5 embodiment is designed to achieve a higher aperture than those of FIGS. 3 and 4 resulting primarily from the inclusion of the additional positive element 18 in the third power component, the additional positive meniscus element 19 in the fourth component giving better control at the higher aperture.

A particular example of transfer lens in accordance with the FIG. 5 embodiment has numerical data as follows:

EXAMPLE 3

| Surface | Radius of Curvature | Axial Thickness/ Separation | Nd | V |
|---|---|---|---|---|
|  |  | 13.840 |  |  |
| R1 | −905.791 | 4.830 | 1.78470 | 26.08 |
| R2 | +168.061 | 24.071 |  |  |
| R3 | +1054.997 | 38.629 | 1.71700 | 47.98 |
| R4 | −156.684 | 153.448 |  |  |
| R5 | +868.056 | 5.154 | 1.78470 | 26.08 |
| R6 | +227.555 | 58.671 | 1.62041 | 60.33 |
| R7 | −227.555 | 0.685 |  |  |
| R8 | +252.369 | 6.196 | 1.78470 | 26.08 |
| R9 | +132.800 | 55.381 | 1.51680 | 64.17 |
| R10 | +713.657 | 0.685 |  |  |
| R15 | +135.484 | 40.165 | 1.71700 | 47.98 |
| R16 | +258.938 | 90.166 |  |  |
| R17 | +258.938 | 14.476 | 1.78470 | 26.08 |
| R18 | +512.981 | 52.894 |  |  |
| R11 | −97.355 | 6.580 | 1.60562 | 43.93 |
| R12 | −158.573 | 31.748 |  |  |
| R13 | −97.355 | 7.293 | 1.60562 | 43.93 |
| R14 | −158.573 | 177.498 |  |  |

EFL = 100; Aperture F/0.84; 74 degrees FOV; Aperture Stop on R5; Magnification × 2.75 Nominal
CRT Faceplate:- Thickness 10.281; Nd 1.62041; V 60.33; Distance from R1 7.505
Fresnel field lens:- polymethylmethacrylate Thickness 5.571

The power balances of the respective components in the above examples are given by the following focal lengths:

|  | First Component | Second Component | Third Component | Fourth Component |
|---|---|---|---|---|
| Example 1 | −1.86F | +1.91F | +1.58F | −2.96F |
| Example 2 | −2.01F | +2.05F | +1.56F | −2.55F |
| Example 3 | −1.79F | +1.92F | +1.67F | −2.07F (−3.75F) |

The bracketed figure for the fourth component in Example 3 is the focal length if the additional positive meniscus element 19 is omitted.

It will be understood that the third component provides most of the power of the overall lens being well spaced from object and image.

It will be seen that in each of the above examples the two negative meniscus elements 16 and 17 have the same curvature, i.e. in each case R11 has the same radius of curvature as R13 and R12 has the same radius of curvature as R14. However, as explained previously, similar curvatures for these elements is not essential.

Further, it will be seen that in the embodiments of FIGS. 3 and 4 the first component singlet element 12 is meniscus while in the embodiment of FIG. 5 it is bi-concave. It will therefore be understood that this element could be plano-concave.

The Fresnel field lens 5 in the above examples is of polymethylmethacrylate but it could alternatively be of other optical plastics material such as polycarbonate.

The combiner 3 may, for example, comprise a pellicle or may, as a further example, comprise a glass "sandwich" consisting of two glass plates cemented together with a suitable partially reflecting coating on one of the internal faces of the "sandwich".

I claim:

1. A transfer lens comprising a first component which in use is towards the object, the first component being a field-flattening component of negative power which reduces the Petzval sum of the overall lens, a second component of positive power which provides overcorrect astigmatism, a third component of positive power consisting only of a plurality of spaced positive members and which provides most of the power of the overall lens, the third component having undercorrect astigmatism which is corrected by the overcorrect astigmatism of the second component, and a fourth component of negative power which increases the field angle of the overall lens.

2. A transfer lens according to claim 1 in which the first component consists of a negative singlet element having a concave surface facing towards the second component.

3. A transfer lens according to claim 1 in which the second component consists of a positive singlet double convex element whose convex surface facing towards the third component is of stronger curvature than its convex surface facing towards the first component.

4. A transfer lens according to claim 1 in which the third component comprises at least one positive doublet member.

5. A transfer lens according to claim 4 in which the third component consists of two positive doublet members.

6. A transfer lens according to claim 4 in which the third component consists of a positive doublet member and a positive singlet member.

7. A transfer lens according to claim 4 in which the third component consists of two positive doublet members and a positive singlet member.

8. A transfer lens comprising a first component which in use is towards the object, the first component being a field-flattening component of negative power which reduces the Petzval sum of the overall lens, a second component of positive power which provides overcorrect astigmatism, a third component of positive power consisting of a plurality of positive members and which provides most of the power of the overall lens, undercorrect astigmatism of the third component being corrected by the overcorrect astigmatism of the second component, and a fourth component of negative power which increases the field angle of the overall lens, in which lens the first component consists of a negative singlet element having a concave surface facing towards the second component, the second component consists of a positive single double convex element whose convex surface facing towards the third component is of stronger curvature than its convex surface facing towards the third component, the third component comprises at least one positive doublet member, and the fourth component comprises two negative singlet meniscus elements whose concave surfaces face towards the third component.

9. A transfer lens according to claim 8 in which the fourth component includes an additional positive member.

10. A transfer lens according to claim 9 in which the additional positive member is a positive singlet meniscus element whose convex surface faces towards the third component.

11. A transfer lens according to claim 1 in which the first component has a focal length of about $-2F$ (where F is the focal length of the overall lens), the second component has a focal length of about $+2F$, the third component has a focal length of about $+1.5F$, and the fourth component has a focal length of around $-2F$ to $-4F$.

12. A transfer lens according to claim 1 in which the first component has a focal length in the range $-1.6F$ to $-2.2F$ (where F is the focal length of the overall lens), the second component has a focal length in the range $+1.7F$ to $+2.3F$, the third component has a focal length in the range $+1.4F$ to $+1.8F$, and the fourth component has a focal length in the range $-1.9F$ to $-4.1F$.

13. Display apparatus including a transfer lens comprising a first component which in use is towards the object, the first component being a field-flattening component of negative power which recuces the Petzval sum of the overall lens, a second component of positive power which provides overcorrect astigmatism, a third component of positive power consisting only of a plurality of spaced positive members and which provides most of the power of the overall lens, the third component having undercorrect astigmatism which is corrected by the overcorrect astigmatism of the second component, and a fourth component of negative power which increases the field angle of the overall lens, and further comprising a primary display means providing an object for the transfer lens and a field lens located at the position of the image given by the transfer lens.

14. Display apparatus according to claim 13 in which the primary display means comprises two primary displays and the apparatus includes combiner means effective to combine light from the two primary displays so that the transfer lens produces a combined image.

15. Head-down display apparatus having primary display means providing two primary displays respectively comprising a cathode ray tube and a map screen, combiner means effective to combine light from the cathode ray tube and the map screen, a transfer lens for imaging the combined light at an image position, and a field lens at that image position, in which the transfer lens comprises a first component which in use is towards the object, the first component being a field-flattening component of negative power which reduces the Petzval sum of the overall lens, a second component of positive power which provides overcorrect astigmatism, a third component of positive power consisting only of a plurality of spaced positive members and which provides most of the power of the overall lens, the third component having undercorrect astigmatism which is corrected by the overcorrect astigmatism of the second component, and a fourth component of negative power which increases the field angle of the overall lens.

16. Display apparatus according to claim 14 or claim 15 in which the first and second components of the transfer lens are located between the primary display means and the combiner means and are duplicated in the light paths from the two primary displays.

17. Display apparatus according to claim 13 or claim 15 in which the field lens is a Fresnel lens.

18. A transfer lens comprising lens elements whose successive surfaces R1 to R14 have radii of curvature, whose axial thicknesses and separations, and whose refractive indices Nd and Abbe numbers V are substantially in accordance with the following table:

| Surface | Radius of Curvature | Axial Thickness/Separation | Nd | V |
|---|---|---|---|---|
|  |  | 18.290 |  |  |
| R1 | +707.310 | 5.319 | 1.80518 | 25.43 |
| R2 | +124.264 | 24.095 |  |  |
| R3 | +630.258 | 32.653 | 1.69100 | 54.71 |
| R4 | −163.861 | 155.839 |  |  |
| R5 | +451.613 | 6.636 | 1.80518 | 25.43 |
| R6 | +158.646 | 51.876 | 1.51680 | 64.17 |
| R7 | −167.162 | 2.370 |  |  |
| R8 | +167.162 | 52.245 | 1.62041 | 60.33 |
| R9 | −517.390 | 7.953 | 1.62004 | 36.37 |
| R10 | +1129.909 | 189.598 |  |  |
| R11 | −103.884 | 7.637 | 1.51680 | 64.17 |
| R12 | −158.646 | 38.130 |  |  |
| R13 | −103.884 | 8.874 | 1.51680 | 64.17 |
| R14 | −158.646 |  |  |  |

EFL = 100; Aperture F/1.02; 73 degrees FOV

19. A transfer lens comprising lens elements whose successive surfaces R1 to R8 and R10 to R14 have radii of curvature, whose axial thicknesses and separations, and whose refractive indices Nd and Abbe numbers V are substantially in accordance with the following table:

| Surface | Radius of Curvature | Axial Thickness/Separation | Nd | V |
|---|---|---|---|---|
|  |  | 13.747 |  |  |
| R1 | +1181.789 | 4.673 | 1.78472 | 25.76 |
| R2 | +140.179 | 29.170 |  |  |
| R3 | +863.839 | 30.167 | 1.71300 | 53.83 |
| R4 | −174.308 | 156.665 |  |  |
| R5 | +454.175 | 6.275 | 1.78472 | 25.76 |
| R6 | +129.746 | 62.697 | 1.58913 | 61.27 |
| R7 | −254.457 | 0.919 |  |  |
| R8 | +178.588 | 46.682 | 1.58913 | 61.27 |
| R10 | −751.714 | 186.082 |  |  |
| R11 | −99.114 | 8.480 | 1.58913 | 61.27 |
| R12 | −150.049 | 33.213 |  |  |
| R13 | −99.114 | 9.452 | 1.58913 | 61.27 |
| R14 | −150.049 |  |  |  |

EEL = 100; Aperture F/0.99; 72 degrees FOV

20. A transfer lens comprising lens elements whose successive surfaces R1 to R10, R15 to R18, and R11 to R14 have radii of curvature, whose axial thicknesses and separations, and whose refractive indices Nd and Abbe numbers V are substantially in accordance with the following table:

| Surface | Radius of Curvature | Axial Thickness/Separation | Nd | V |
|---|---|---|---|---|
|  |  | 13.840 |  |  |
| R1 | −905.791 | 4.830 | 1.78470 | 26.08 |
| R2 | +168.061 | 24.071 |  |  |
| R3 | +1054.997 | 38.629 | 1.71700 | 47.98 |
| R4 | −156.684 | 153.448 |  |  |
| R5 | +868.056 | 5.154 | 1.78470 | 26.08 |
| R6 | +227.555 | 58.671 | 1.62041 | 60.33 |
| R7 | −227.55 | 0.685 |  |  |
| R8 | +252.369 | 6.196 | 1.78470 | 26.08 |
| R9 | +132.800 | 53.381 | 1.51680 | 64.17 |
| R10 | +713.657 | 0.685 |  |  |
| R15 | +135.484 | 40.165 | 1.71700 | 47.98 |
| R16 | +258.938 | 90.166 |  |  |
| R17 | +258.938 | 14.476 | 1.78470 | 26.08 |
| R18 | +512.981 | 52.894 |  |  |
| R11 | −97.355 | 6.580 | 1.60562 | 43.93 |
| R12 | −158.573 | 31.748 |  |  |
| R13 | −97.355 | 7.293 | 1.60526 | 43.93 |
| R14 | −158.573 |  |  |  |

EFL = 100; Aperture F/0.84; 74 degrees FOV

* * * * *

UNITED STATES PATENT AND TRADEMARK OFFICE
CERTIFICATE OF CORRECTION

PATENT NO. : 4,350,411
DATED : September 21, 1982
INVENTOR(S) : Philip J. Rogers It is certified that error appears in the above-identified patent and that said Letters Patent are hereby corrected as shown below:

Col. 5, line 32, under column headed "V", delete "53.93" and substitute therefor --53.83--.

Col. 10, line 29, in column headed "Radius of Curvature", delete "-227.55" and substitute therefor -- -227.555--.

Col. 10, line 38, in column headed "Nd", delete "1.60526" and substitute therefor --1.60562--.

Signed and Sealed this

Twelfth Day of February 1985

[SEAL]

Attest:

DONALD J. QUIGG

Attesting Officer     Acting Commissioner of Patents and Trademarks